United States Patent [19]
Shimizu et al.

[11] Patent Number: 5,103,409
[45] Date of Patent: Apr. 7, 1992

[54] FIELD MEASURING INSTRUMENT AND ITS ABNORMALITY MANAGING METHOD

[75] Inventors: Yasushi Shimizu; Akira Sase, both of Katsuta, both of Japan

[73] Assignee: Hitachi, Ltd., Tokyo, Japan

[21] Appl. No.: 460,374

[22] Filed: Jan. 3, 1990

[30] Foreign Application Priority Data

Jan. 9, 1989 [JP] Japan .................................. 1-001319

[51] Int. Cl.⁵ ...................... G06F 15/46; G06F 15/20
[52] U.S. Cl. .................................... 364/556; 364/550
[58] Field of Search .............. 364/556, 143, 145, 569, 364/483, 492, 550, 424.04, 467, 200, 900, 551.01; 371/15.1, 16.5, 29.1; 324/500

[56] References Cited

U.S. PATENT DOCUMENTS

| | | | |
|---|---|---|---|
| 4,041,470 | 8/1977 | Slane et al. | 364/424.04 |
| 4,400,783 | 8/1983 | Locke, Jr. et al. | 364/483 |
| 4,484,290 | 11/1984 | Bagnall et al. | 364/483 |
| 4,497,057 | 1/1985 | Kato et al. | 371/15.1 |
| 4,608,638 | 8/1986 | Tsikos | 364/424.04 |
| 4,621,335 | 11/1986 | Bluish et al. | 364/550 |
| 4,740,969 | 4/1988 | Fremont | 371/15.1 |
| 4,752,871 | 6/1988 | Sparks et al. | 364/200 |
| 4,773,028 | 9/1988 | Tallman | 364/550 |
| 4,922,491 | 5/1990 | Coale | 371/16.5 |
| 4,924,404 | 5/1990 | Reinke, Jr. | 364/550 |
| 4,970,726 | 11/1990 | Cain et al. | 371/16.5 |

FOREIGN PATENT DOCUMENTS 63-30715 2/1988 Japan .

Primary Examiner—Kevin J. Teska
Attorney, Agent, or Firm—Antonelli, Terry, Stout & Kraus

[57] ABSTRACT

A field measuring instrument such as a differential pressure/pressure transmitter, an electromagnetic flow meter, a temperature transmitter, or the like which is used for industrial measurement includes a counter which is periodically counted up at a predetermined interval and outputs an interruption signal; a work memory which can temporarily store data; an EEPROM which can store a total operating time of the field measuring instrument and a flag indicative of an abnormality; and a processing unit for receiving the interruption signal of the counter, for incrementing the total time operating times in the work memory, for storing the incremented total operating time into the EEPROM, for self-diagnosing apparatuses in the field measuring instrument and data in accordance with self-diagnosis programs provided in the processing unit, for producing a flag indicative of a state of an abnormality when the abnormality is detected, and for storing the flag into the EEPROM together with the total operating time stored in the work memory.

10 Claims, 5 Drawing Sheets

FIELD MEASURING INSTRUMENT AND ITS ABNORMALITY MANAGING METHOD

BACKGROUND OF THE INVENTION

The present invention relates to a field measuring instrument such as a differential pressure/pressure transmitter, an electromagnetic flow meter, a temperature transmitter, or the like which is managed by a communication unit provided at a central location and is used for industrial measurement or the like. More particularly, the invention intends to provide a field measuring instrument which has a microcomputer and is suitable for self-diagnosing operating states of apparatuses in the field measuring instrument and states of measurement data items and the like, for storing the results of the self-diagnosis without a backup power source, and for managing the results of the self-diagnosis and to provide its abnormality managing method.

Hitherto, field measuring instruments having a microcomputer have been well known.

In general, in such apparatuses, a communication device is connected to a line to supply an output current serving as an operating current of, for instance, 4 to 20 mA to the relevant field measuring instrument and digital communication is executed between the field measuring instrument and the communication device, so that a measuring range of the field apparatus and a damping time constant can be set, the inputs and outputs can be monitored, and the self-diagnosis of the field measuring instrument and the like can be executed.

In the field measuring instrument having such a self-diagnosis function, the self-diagnosis of input abnormality, internal circuit abnormality, software abnormality, and the like is always executed. Such abnormality can be discriminated by inquiring the results of the diagnosis from the side of the communication device. However, the result merely indicates the present abnormal state and there is a problem such that it is impossible to know whether an abnormality has occurred in the past or not.

SUMMARY OF THE INVENTION

As means of solving such a problem, the problem can be accomplished by constructing in a manner such that an EEPROM as a non-volatile memory is provided in the field measuring instrument and when an abnormality is found out by the self-diagnosis, the content of the diagnosis of the abnormality is written into the EEPROM. However, if the content of the diagnosis is merely written into the EEPROM by the above method, there is a problem such that the time of the occurrence of the abnormality cannot be known. To cope with such a problem, there is also considered a method whereby an ordinary timer is provided in the field measuring instrument and the content of the abnormality is written into the EEPROM together with the count value of the timer. However, if the timer does not have a backup power source, when the power source of the timer is once turned off, the time is reset. Most timers ordinarily do not have any backup power source in order to simplify and miniaturize the construction of the apparatus. It is difficult to apply the above construction using the timer to a general field apparatus in which there are not only the case where it is continuously operated but also the case where a situation such that the power supply is temporarily shut out frequently occurs.

As prior art using an EEPROM, U.S. Pat. No. 4,752,871 is known as disclosing a device in which two EEPROM's are employed for independently programmed erasable readable memories. Also in JP-A-63-30715, there is disclosed the use of an EEPROM for writing travelling distance data by each bit in an automobile odometer.

Therefore, according to the invention, the total operating time of the field measuring instrument is written into the EEPROM and when the occurrence of an abnormality is detected by the self-diagnosis, both of the total operating time at the time point of the occurrence of the abnormality and the content of the abnormality are written into the EEPROM. According to such a construction, in response to an inquiry from the communication device, the total operating time at the time point of the occurrence of the abnormality and the content of the abnormality which were written in the EEPROM are read out and transmitted. Therefore, even if there exists a period of time of the power shut-off, such a power shut-off time is managed by the side of the communication device and such a contruction is well known. The time of the actual occurrence of the abnormality can be specified from the total operating time stored in the EEPROM.

DESCRIPTION OF THE PREFERRED EMBODIMENTS

An embodiment of the present invention shown in the diagrams will be described hereinbelow.

Figure 1:
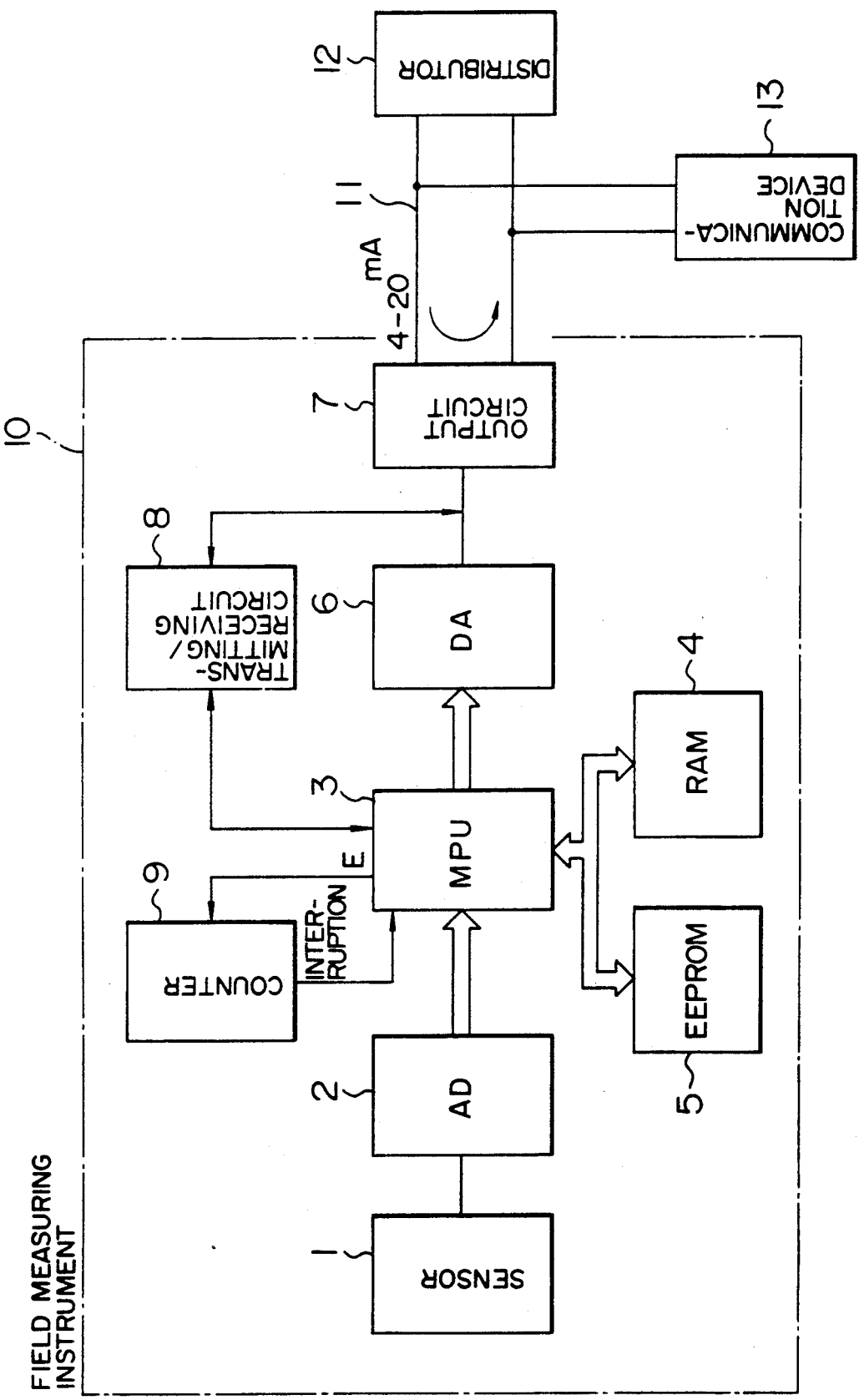
FIG. 1 is a block constructional diagram of an embodiment of a field apparatus according to the invention.

As shown in FIG. 1 as an example, a field measuring instrument 10 can supply an operating current of 4 to 20 mA from a distributor 12 through lines 11. On the other hand, the operation, the read-out of a signal, etc., can be instructed from a communication device 13 connected to the lines 11.

The field measuring instrument 10 includes a sensor 1 which is provided for a predetermined object to be measured; an AD converter 2 for AD converting a detection signal of the sensor 1; an MPU 3 for correcting a nonlinear component of an output of the sensor 1 and calculating a conversion value for a measuring range from a digital signal from the AD converter 2; and a RAM 4 which is used as a work memory for the MPU 3. On the other hand, the field measuring instrument 10 also has therein an EEPROM 5 which can store data to indicate to which value the measuring range of the field measuring instrument has been set and to produce an output as a detection value in accordance with the value, management data such as maintenance date and time and content of the maintenance of the field measuring instrument, and the like. Further, the field measuring instrument 10 includes a DA converter 6 for again converting the result of the calculation of the MPU 3 into the analog signal of 4 to 20 mA; an output circuit 7; a transmitting/receiving circuit 8 for executing digital communication with the communication device 13; and a counter 9 to periodically interrupt the MPU 3 at a predetermined interval.

The MPU 3 used in the field measuring instrument 10 has therein a self-diagnosis program such as a program which is generally used in conventional apparatuses. In a ROM (not shown) to correct the characteristics, desired set self-diagnoses such as a sum check of a conversion list, a check of the AD value, electrical zero correction of the AD value, a check of an input abnormality, and the like can be executed by a predetermined self-diagnosis cycle.

Figure 2:
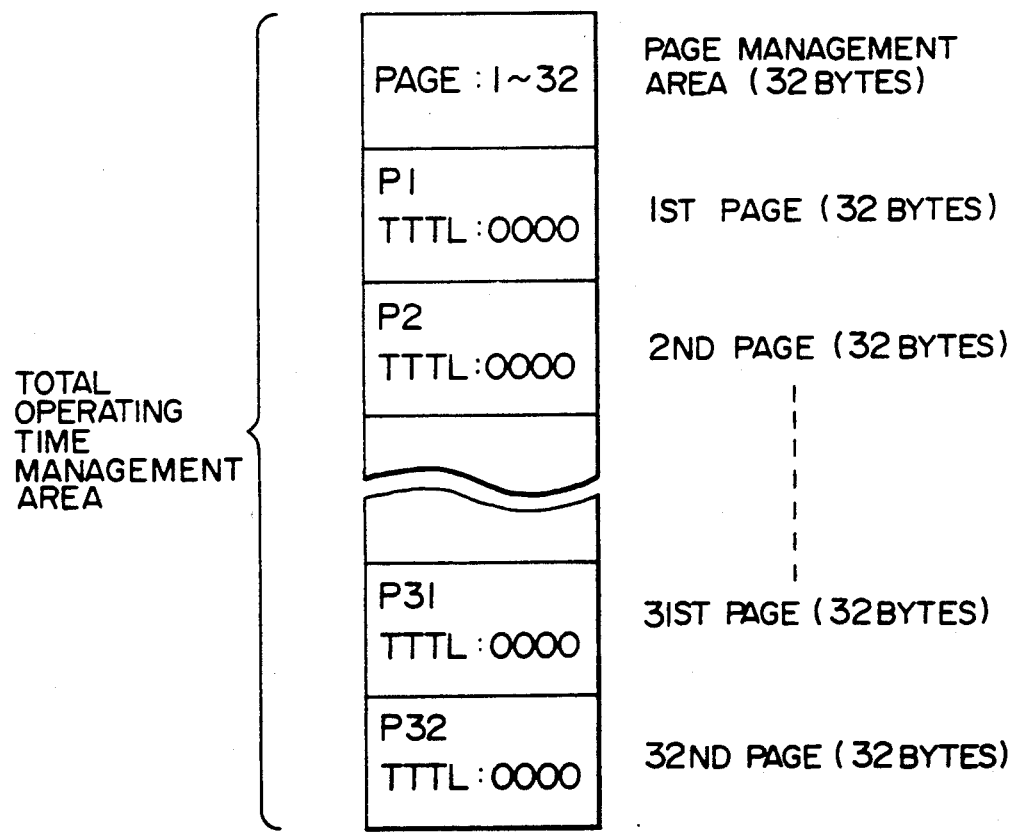
FIG. 2 is an arrangement diagram of a total operating time management area in an EEPROM in FIG. 1.

The EEPROM 5 writes data from the MPU 3 on a 32-byte unit basis by a well-known method. At this time, since there is a limit life of the number of writing times of a special page, the record of the total number of operating times which is periodically increased at a predetermined interval is managed as follows. FIG. 2 shows a construction of a total operating time management area provided in the EEPROM 5. First, a plurality of pages P1 to P32 which are rewritten for only a predetermined number of times (for instance, on the order of about $10^4$) are provided. The total number of operating times TTTL (TIME TOTAL) (1 hour, 2 hours, ..., 15 hours, ...) is sequentially updated and written into the page by only the predetermined number of times.

When the predetermined time number (for instance, the value which is set on the order of about $10^4$) is updated, the page is shifted to the next page and the counting operation is restarted from "0". Therefore, a page management area PAGE indicating that the TTTL is at present being written by using which one of the pages P1 to P32 is provided in the head portion of the total operating time management area in the EEPROM 5. Therefore, the actual total operating time of the field measuring instrument 10 can be calculated by adding the elapsed time of 120 after the transfer to the page P3 to the value of (the predetermined the number × 2) on the basis of the page number (for instance, PAGE: 3) written in the page management area PAGE and the count value (for example, TTTL: 0120) written in the page P3.

Figure 3:
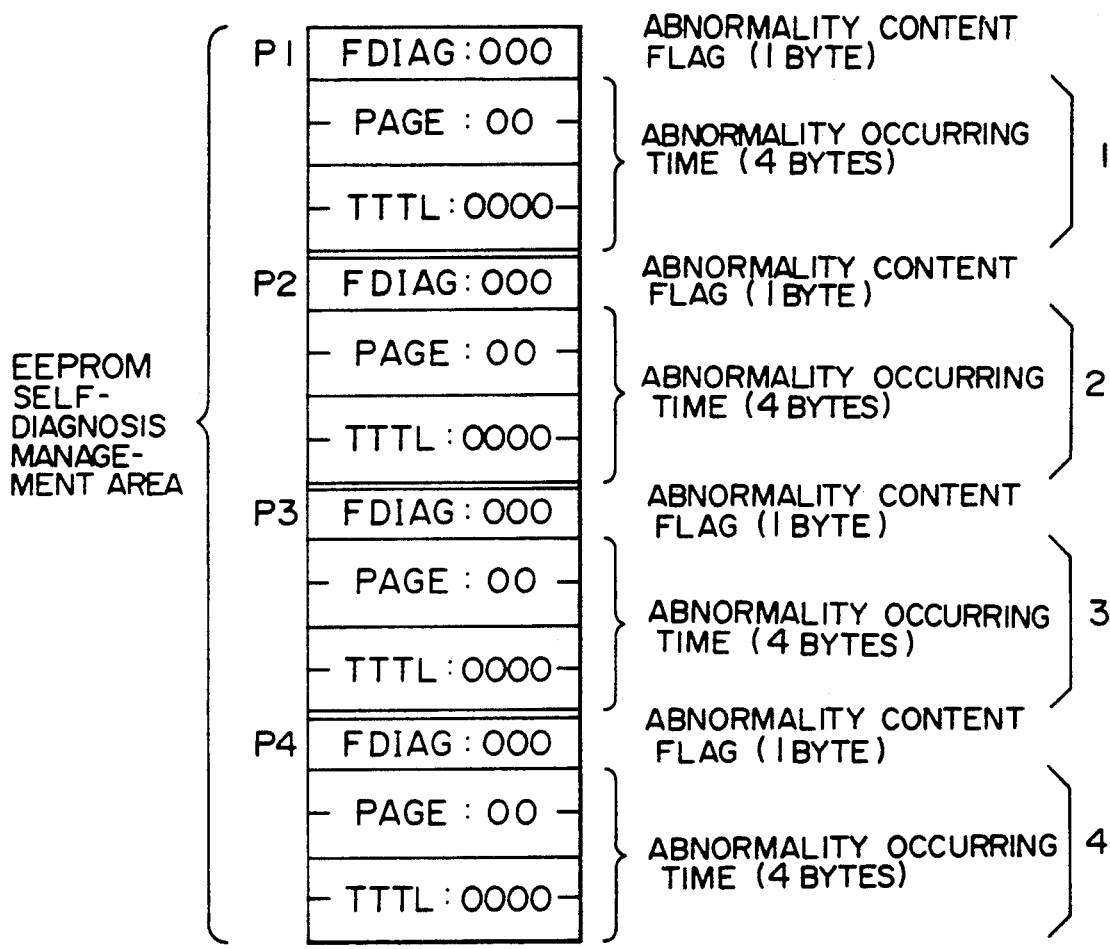
FIG. 3 is an arrangement diagram of a self-diagnosis management area in the EEPROM.

On the other hand, as shown in FIG. 3 as an example, a self-diagnosis management area is provided in the EEPROM 5. As will be also described in detail hereinlater in the paragraphs regarding the operation, the self-diagnosis management area is constructed by a plurality of sets each including a flag storage area FDIAG to store an abnormality content flag produced by the processes of the self-diagnosis program in the MPU 3; a page storage area PAGE to write one of the pages P1 to P32 which is at present being used in correspondence to the total operating time management area; and a total operating time storage area TTTL to store the total operating time after the transfer to the page. In the case of the embodiment, four sets of P1 to P4 are provided. If an abnormality is detected in excess of the page number P4, data is again written beginning from the page number P1.

Figure 4:
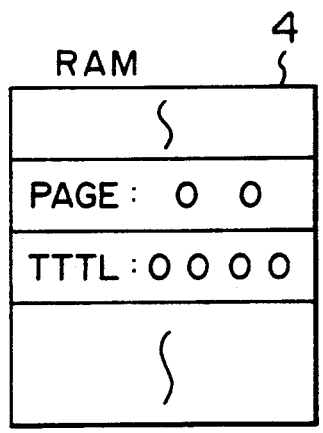
FIG. 4 is a diagram showing an example of a construction of a storage area in an RAM in FIG. 1.

FIG. 4 now shows an example of a page storage area PAGE and the total operating time storage area TTTL which are used in the EEPROM 5 in the RAM 4 as a work memory provided in the field measuring instrument 10. The meanings of the special areas in the RAM 4 will be more clearly explained in the paragraphs of the operation hereinlater. At the start of the operation of the field measuring instrument 10, the value of the total operating times stored in the EEPROM (initially, P: 1, TTTL: 0000, on the other hand, in the case where the power source is again turned on after the power source was once shut off, for instance, P: 3; TTL: 0120, etc.) is copied. The value stored in the RAM 4 is increased by the count-up of the counter 9.

Figure 5A:
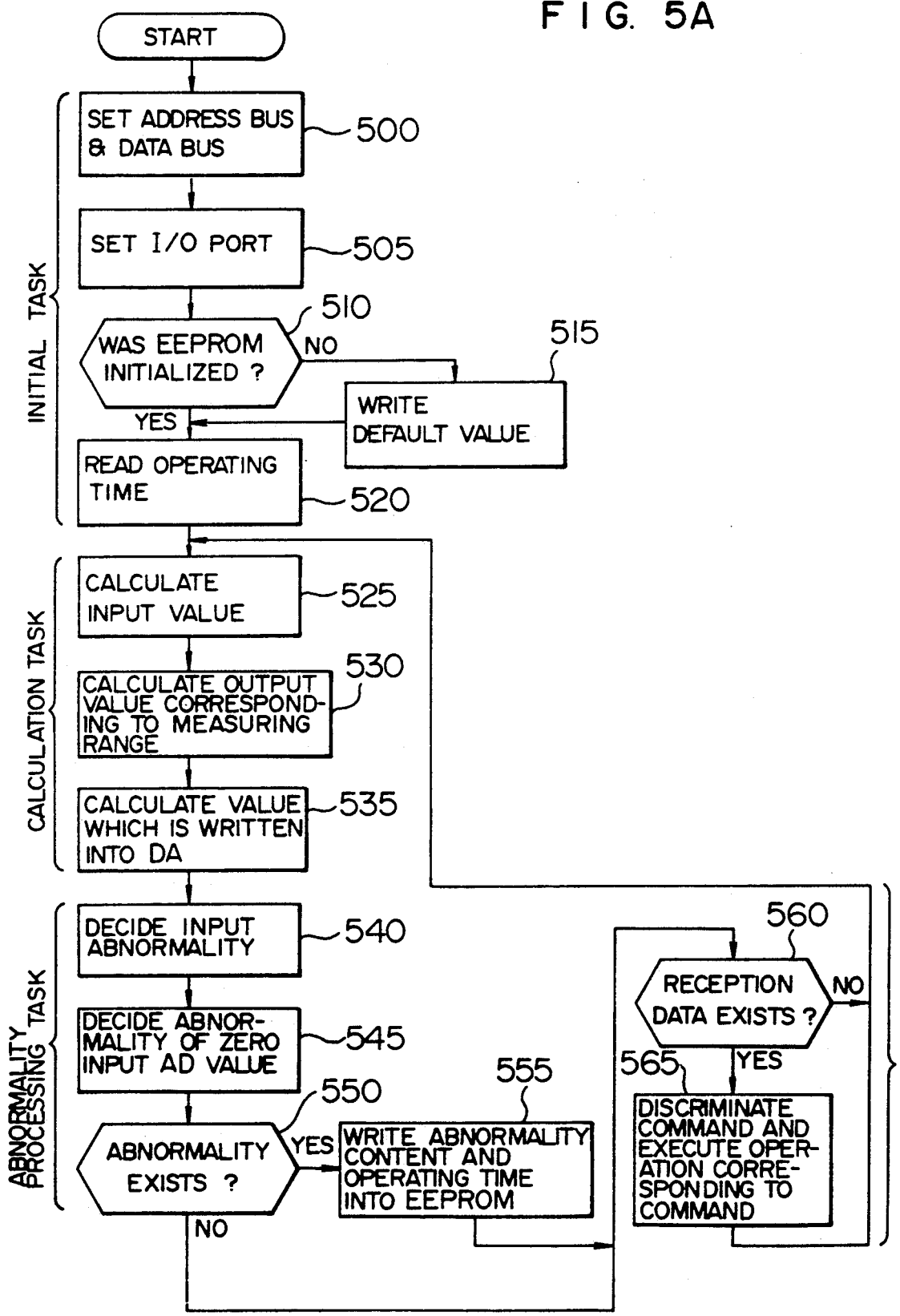
FIGS. 5A and 5B are operation flowcharts for a field measuring instrument of the construction of FIG. 1.
Figure 5B:
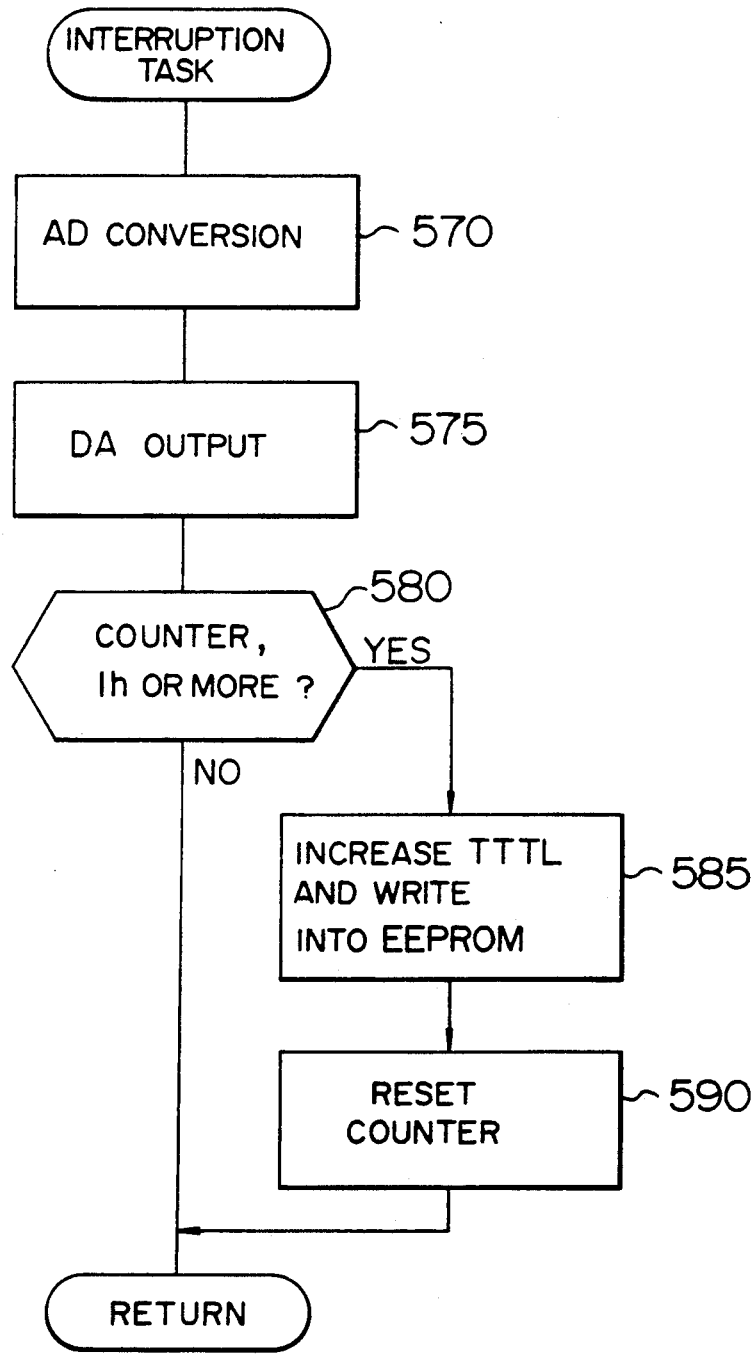

The operation of the field measuring instrument 10 will now be described with reference to the flowcharts of FIGS. 5A and 5B.

First, the initial task from step 500 to step 520 is executed in the first stage of the operation. An address bus and a data bus are set among the MPU 3, the RAM 4, and the EEPROM 5 (step 500). An input/output port is then set (step 505).

A check is made to see if the EEPROM has been initialized or not (step 510). If the apparatus is being used for the first time and is not initialized yet, a default value is written into the EEPROM 5 (step 515). On the other hand, if the EEPROM 5 has been once initialized in a state in which the power source was shut off after the operation had been started once and then the power source was again turned on or the like, step 520 follows and the operating time is read out of the EEPROM 5 and is stored into the RAM 4.

The total number of operating times such as PAGE: 00, TTTL: 0000 in the case of the start point of the use of the apparatus, PAGE: 01, TTTL: 0012 in a state in which after the power source had been shut off during the operation, it was again turned on, or the like is stored into the RAM 4 as a work memory in a form shown in FIG. 4 by the initial task.

After completion of the initial task, the next calculation task follows. The MPU 3 calculates the input value which is obtained by converting the detection value of the sensor 1 into the digital value by the AD converter 2 (step 525), calculates the output value corresponding to the measuring range (step 530), and calculates the value which is output to the DA conveter 6 (step 535).

After completion of the calculation task to process the detection value, an abnormality processing task follows and a check is made to see if an input from the AD converter 2 indicates an abnormality or not (step 540). A check is made to see if the output from the AD converter 2 is "0" or not or to see if the AD conversion value indicates the abnormality or not, or the like (step 545). If the existence of the abnormality is decided, a flag corresponding to the detected abnormality is formed by the self-diagnosis program provided in the MPU 3 and is output. Further, the MPU 3 transfers to the EEPROM 5 both of the flag indicative of the state of abnormality and the total operating time stored in the RAM 4 at that time point, for instance, PAGE: 01, TTTL: 0012 and writes both of the content of abnormality and the total operating time generated such as FDIAG: 010, PAGE: 001, TTL: 0012 into the self-diagnosis management area shown in FIG. 3 (step 555). After completion of the abnormality processing task, the reception processing task follows and the presence or absence of the reception data from the communication device which is fetched through the transmitting-/receiving circuit 8 is discriminated (step 560). If the reception data has been confirmed, a command such as data transmission in the self-diagnosis management area which is included in the reception data is executed.

As mentioned above, the processes are sequentially executed by the initial task, calculation task, abnormality processing task, and reception processing task. An interruption task which operates in a cycle of a period which is ordinarily longer than the above series of processing cycle is set.

The interruption task is executed by the operation of the counter 9. When the output of the AD converter 2 was processed and the data output to the DA converter 6 was finished (steps 570, 575), a check is made to see if the counter 9 has counted up one hour in the case of the embodiment or not. If the counter 9 has counted up one hour, the total operating time such as PAGE: 01, TTTL: 0012 in the RAM shown in FIG. 4 is increased and rewritten to PAGE: 01, TTTL: 0013. At the same time of the rewriting, the value in the RAM is also copied as the value of the TTTL of the relevant page in the total operating time management area in the EEPROM 5.

If the value in the RAM 4 is set to PAGE: 01, TTTL: 9999 at that time point, this means that the storage time of the page indicates a predetermined rewriting set time number. Therefore, PAGE: 02, TTTL: 0000 are set. The written value in this case is copied into the total operating time management area in a manner similar to the above and its content is rewritten. However, at this time, the value of TTTL of the first page is held to 9999 and the TTTL of the second page is set to 0000 and the content of the page management area is rewritten to PAGE: 2 (step 585).

After completion of the above processes, the counter 9 is reset and the counting operation by the counter 9 is restarted.

By the above procedure, the inherent measuring operation of the field apparatus is executed and the total operating time of the field apparatus is sequentially written into the EEPROM by a combination of PAGE and TTTL, and if an abnormality is detected in the operating time by the self-diagnosis program, both the flag indicative of the content of the abnormality and the time of occurrence of the abnormality are written into the self-diagnosis management area. Therefore, when an inquiry is generated from the communication device, both the content of the abnormality and the time of the occurrence of the abnormality can be output. Even if the power source is once shut off for convenience of the operation, the recorded content is held in the EEPROM without a backup power source. After the power source is again turned on, by compensating for the power shut-off time which is ordinarily known, the time of the occurrence of the abnormality can be also accurately known. Thus, the total operating time can be also used for the management upon regular inspection or the management of the exchange timings of the maintenance parts. In the embodiment, there has merely been shown an example of the number of pages and the number of writing times of each page in the total operating time management area in the EEPROM, the number of pages in the self-diagnosis management area, and the count-up time of the counter. Those values can be also set to arbitrary values in accordance with desired design conditions of the apparatus.

We claim:

1. A field measuring instrument disposed in a field location in an industrial plant and connected to a communication device at a central location in the industrial plant via a communication line, wherein the field measuring instrument transmits data to the communication device via the communication line, and wherein the communication device modifies an operational parameter of the field measuring instrument via the communication line, the field measuring instrument comprising:

a sensor for measuring a parameter to be measured and for outputting a detection signal representing the measured parameter;

a processing unit for receiving the detection signal from the sensor and processing the received detection signal, and for executing a self-diagnosis program for detecting an abnormality in the field measuring instrument, the processing unit outputting an abnormality flag when an abnormality is detected;

a counter for counting a predetermined interval of time and for outputting an interruption signal to the processing unit each time the predetermined interval of time is counted;

a work memory connected to the processing unit for temporarily storing a total number of interruption signals output by the counter; and an EEPROM connected to the processing unit for permanently storing the total number of interruption signals output by the counter, and the abnormality flag output by the processing unit together with the total number of interruption signals output by the counter at the time the abnormality is detected by the processing unit, the EEPROM being initialized by the processing unit before being used for the first time;

wherein the processing unit sets the total number of interruption signals stored in the work memory and the total number of interruption signals stored in the EEPROM to zero when power is applied to the field measuring instrument and the EEPROM has not yet been initialized, and copies the total number of interruption signals stored in the EEPROM into the work memory when power is applied to the field measuring instrument and the EEPROM has already been initialized;

wherein the processing unit increments the total number of interruption signals stored in the work memory and stores the incremented total number of interruption signals in the EEPROM each time the counter outputs an interruption signal to the processing unit; and wherein the processing unit stores the abnormality flag output by the processing unit in the EEPROM together with the total number of interruption signals stored in the work memory at the time the abnormality is detected by the processing unit.

2. A field measuring instrument according to claim 1, wherein the field measuring instrument is one of a differential pressure/pressure transmitter, an electromagnetic flow meter, and a temperature transmitter, and the operational parameter is one of a measuring range and a damping time constant of the field measuring instrument.

3. A field measuring instrument according to claim 1, wherein the EEPROM includes a total operating time management area in which the total number of interruption signals output by the counter is stored, and a self-diagnosis management area in which the abnormality flag output by the processing unit is stored together with the total number of interruption signals stored in the work memory at the time the abnormality is detected by the processing unit.

4. A field measuring instrument according to claim 3, wherein the work memory includes a time recording area for storing a total operating time, the total operating time being incremented by the processing unit each time the counter outputs an interruption signal to the processing unit, and being reset to zero by the processing unit when the total operating time stored in the time recording area becomes equal to a predetermined value, and wherein the work memory further includes a page recording area for storing a page number indicating a number of times the total operating time has been reset to zero by the processing unit; and wherein the total operating time management area of the EEPROM includes a page management area and a plurality of pages, and wherein the processing unit copies the page number stored in the page recording area of the work memory into the page management area of the EEPROM, and copies the total operating time stored in the time recording area of the work memory into one of the plurality of pages corresponding to the page number stored in the page management area of the EEPROM, each time the counter outputs an interruption signal to the processing unit.

5. A field measuring instrument according to claim 4, wherein the self-fiagnosis management area in the EEPROM includes a plurality of data sets each including a flag storing area, a page storing area, and a time storing area; and wherein the processing unit stores the abnormality flag, the page number stored in the page recording area of the work memory, and the total operating time stored in the time recording area of the work memory in the flag storing area, the page storing area, and the time storing area, respectively, of a corresponding one of the plurality of data sets of the self-diagnosis management area.

6. A field measuring instrument according to claim 5, wherein the communication device transmits an abnormality output request signal to the field measuring instrument via the communication line, and wherein the field measuring instrument reads out the contents of the flag storing area, the page storing area, and the time storing area of each of the plurality of data sets of the self-diagnosis management area of the EEPROM in response to the abnormality output request and transmits the read-out contents to the communication device via the communication line.

7. An abnormality managing method for a field measuring instrument disposed in a field location in an industrial plant and connected to a communication device at a central location in the industrial plant via a communication line, wherein the field measuring instrument transmits data to the communication device via the communication line, and wherein the communication device modifies an operational parameter of the field measuring instrument via the communication line, the field measuring instrument including a work memory for temporarily storing data, and an EEPROM for permanently storing data, the abnormality managing method comprising the steps of:

periodically producing an interruption signal at a predetermined interval of time;

incrementing a total number of interruption signals stored in the work memory and storing the incremented total number of interruption signals in the EEPROM each time an interruption signal is produced;

executing a self-diagnosis program for detecting an abnormality in the field measuring instrument and outputting an abnormality flag when an abnormality is detected;

storing the abnormality flag in the EEPROM together with the total number of interruption signals stored in the work memory at the time the abnormality is detected.

8. An abnormality managing method according to claim 7, wherein the work memory includes a time recording area for storing a total operating time, the total operating time being incremented each time an interruption signal is produced, and being reset to zero when the total operating time stored in the time recording area becomes equal to a predetermined value, and wherein the work memory further includes a page recording area for storing a page number indicating a number of times the total operating time has been reset to zero; and wherein the EEPROM includes a page management area and a plurality of pages, and wherein the page number stored in the page recording area of the work memory is copied into the page management area of the EEPROM, and the total operating time stored in the time recording area of the work memory is copied into one of the plurality of pages corresponding to the page number stored in the page management area of the EEPROM, each time an interruption signal is produced.

9. An abnormality managing method according to claim 7, wherein the predetermined interval of time at which the interruption signal is periodically produced is longer than a period necessary for executing the self-diagnosis program.

10. An abnormality managing method according to claim 7, wherein the field measuring instrument is one of a differential pressure/pressure transmitter, an electromagnetic flow meter, and a temperature transmitter, and the operational parameter is one of a measuring range and a damping time constant of the field measuring instrument.

* * * * *